H. BEAMER.
Fruit Drier.
No. 30,285.
Patented Oct. 9, 1860.
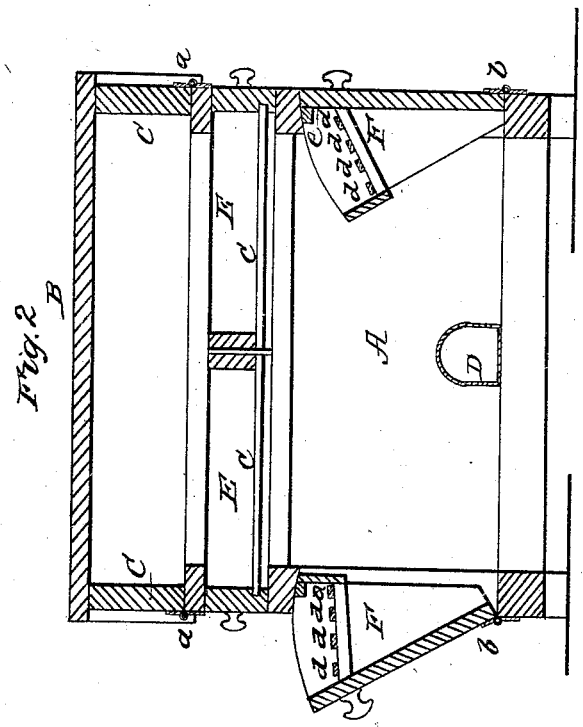
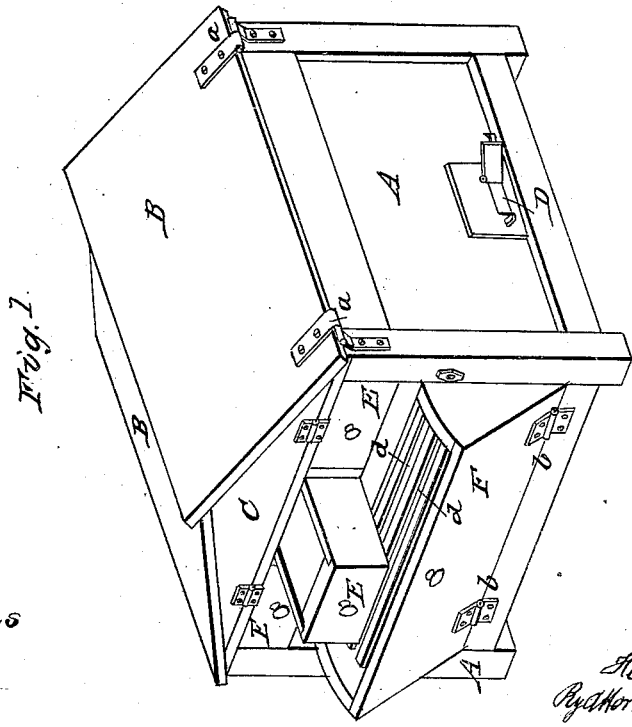

UNITED STATES PATENT OFFICE.

HENRY BEAMER, OF SMITHSBURG, MARYLAND.

FRUIT-DRIER.

Specification of Letters Patent No. 30,285, dated October 9, 1860.

*To all whom it may concern:*

Be it known that I, HENRY BEAMER, of Smithsburg, in the county of Washington and State of Maryland, have invented certain new and useful Improvements in Fruit-Driers; and I do hereby declare the following to be a full, clear, and exact description of the construction and operation of the same, reference being had to the accompanying drawings, making a part of this specification, in which—

Figure 1, represents a perspective view of the drying house, and its several connections. Fig. 2, is a longitudinal vertical section through the same, showing the interior of the drying house.

Similar letters of reference where they occur in the separate figures denote like parts of the apparatus in both the drawings.

My invention consists in the particular construction and arrangement, of the house and its drying shelves, so that the fruit may be subjected to artificial drying, and to sun and air drying, as the weather or the condition of the fruit, may require.

To enable others skilled in the art to make and use my invention, I will proceed to describe the same with reference to the drawings.

A, represents the walls of the dry house, which may be of rectangular form, and built of wood or other material, and may be portable or stationary. The covers B, B, of the drying house, as well as the gables C, C, are hinged as at *a*, *a*, &c., so that they may be turned down against the sides and ends of the house, to allow the air to freely circulate over the fruit. In the under part of the drying chamber there is a stove or furnace D, for creating artificial heat, when the drying is to be done by such heat.

E, E, &c., are a series of drawers or trays, having slatted bottoms *c* so as to allow the heat to freely circulate through the fruit laid upon them.

In the ends of the drying house are arranged frames F, F, that are hinged at *b*, said frames being also furnished with slatted bottoms *d*, and so made as to form a tray to hold fruit. These frames F, may be swung into the drying chamber when using artificial heat, as shown on the right of Fig. 2, or swung out into the sun and air, when that kind of drying is done, as shown to the left of Figs. 1 and 2, so that the house is equally applicable to artificial or to sun and air, or "out of doors drying". The object of letting down the roof and gables, is that the draft across the top of the fruit shall not be impeded, and so that also the fruit shall not be shaded from the sun. In wet weather, or at night, the gables and roof are closed up, the hinged frames F, swung into the drying chamber, and if desirable a fire may be made in the furnace.

A strip *e*, may be so arranged as to catch and hold the frames F, when they are swung out to the proper distance, and prevent them from falling. When closed the overhanging of the tray will hold them shut. It thus requires but a moment's time to open up the drying shelves or trays to the sun and air, or to inclose them in the drying chamber.

I am aware that extension trays have been used, but they were so made as to require much space when drawn out, and when run into the chamber were so piled one tray over the other, that artificial heat could not be used, the vapor rising from the lower tiers sweating the fruit on the upper ones, and thus seriously injuring it.

Having thus fully described the nature and object of my invention, I would state that I am aware a flat hinged cover has been used on a dryhouse. This I do not claim, but

What I do claim herein is—

1. In combination with the drawers or trays E, the double inclined hinged covers B, B, and hinged gables C, C, arranged as herein represented so as to protect, or expose, said trays, in the manner and for the purpose set forth.

2. In combination with the drying chamber, the hinged frames E, that may be swung into, or out of said chamber for the purpose of protecting or drying by artificial heat inside or exposing the fruit to the air or sun, as circumstances may require, and as set forth.

HENRY BEAMER.

Witnesses:
A. B. STOUGHTON,
I. HIRSCH.